US012803765B2

(12) United States Patent
Matsumura et al.

(10) Patent No.: US 12,803,765 B2
(45) Date of Patent: Nov. 17, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 287 days.

(21) Appl. No.: 18/697,324

(22) PCT Filed: Oct. 1, 2021

(86) PCT No.: PCT/JP2021/036516
§ 371 (c)(1),
(2) Date: Mar. 29, 2024

(87) PCT Pub. No.: WO2023/053460
PCT Pub. Date: Apr. 6, 2023

(65) Prior Publication Data

US 2025/0007676 A1 Jan. 2, 2025

(51) Int. Cl.
*H04L 5/00* (2006.01)
*H04W 72/231* (2023.01)

(52) U.S. Cl.
CPC ......... *H04L 5/0094* (2013.01); *H04W 72/231* (2023.01)

(58) Field of Classification Search
None
See application file for complete search history.

(56) References Cited

U.S. PATENT DOCUMENTS

2024/0172245 A1* 5/2024 Svedman .............. H04W 72/21

OTHER PUBLICATIONS

International Search Report issued in PCT/JP2021/036516 on May 17, 2022 (3 pages).
Written Opinion of the International Searching Authority issued in PCT/JP2021/036516 on May 17, 2022 (3 pages).
Moderator (Samsung); "Moderator summary#6 for multi-beam enhancement: Round 3B"; 3GPP TSG RAN WG1 #104-e, R1-2102112; e-Meeting; Jan. 25-Feb. 5, 2021 (45 pages).
Nokia, Nokia Shanghai Bell; "Enhancements on Multi-beam Operation"; 3GPP TSG RAN WG1 #102-e, R1-2006843; e-Meeting; Aug. 17-28, 2020 (17 pages).
CATT; "Enhancements on multi-beam operation"; 3GPP TSG RAN WG1 #104-e, R1-2100343; e-Meeting; Jan. 25-Feb. 5, 2021 (19 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

(Continued)

*Primary Examiner* — Angela Nguyen
(74) *Attorney, Agent, or Firm* — Osha Bergman Watanabe & Burton LLP

(57) ABSTRACT

A terminal according to an aspect of the present disclosure includes: a receiving section that receives an indication of one or more transmission configuration indication (TCI) states for at least one of downlink and uplink, with respect to one of a plurality of cells for carrier aggregation; and a control section that applies the one or more TCI states to a part or all of the plurality of cells. An aspect of the present disclosure allows a TCI state with respect to a plurality of cells/CCs to be appropriately determined.

4 Claims, 10 Drawing Sheets

(56) References Cited

OTHER PUBLICATIONS

Office Action issued in Japanese Patent Application No. 2023-551010, mailed on Jun. 24, 2025 (6 pages).
ZTE; "Enhancements on Multi-beam Operation"; 3GPP TSG RAN WG1 Meeting #103-e, R1-2007763; e-Meeting; Oct. 26-Nov. 13, 2020 (22 pages).
Xiaomi; "Enhancements on multi-beam operation"; 3GPP TSG RAN WG1 #106-e, R1-2107893; e-Meeting; Aug. 16-27, 2021 (13 pages).

* cited by examiner

CC-specific TCI state pool

CC-common TCI state pool

FIG. 5A joint TCI state pool

| TCI field value | DL/UL joint TCI |
|---|---|
| 000 | TCI#0 |
| 001 | TCI#1 |
| 010 | TCI#2 |
| 011 | TCI#3 |
| 100 | TCI#4 |
| 101 | TCI#5 |
| 110 | TCI#6 |
| 111 | TCI#7 |

Joint TCI (000–111)

FIG. 5B separate TCI state pool

| TCI field value | DL only TCI | UL only TCI |
|---|---|---|
| 000 | TCI#0 | - |
| 001 | TCI#1 | - |
| 010 | - | TCI#2 |
| 011 | - | TCI#3 |
| 100 | TCI#4 | TCI#5 |
| 101 | TCI#6 | TCI#7 |
| 110 | TCI#8 | TCI#9 |
| 111 | TCI#10 | TCI#11 |

DL-only TCI (000–001)

UL-only TCI (010–011)

DL-only TCI + UL-only TCI (100–111)

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), it is studied that a user terminal (terminal, User Equipment (UE)) controls transmission/reception processing, based on information related to quasi-co-location (QCL) (QCL assumption/Transmission Configuration Indication (TCI) state/spatial relation).

It is studied to apply a TCI state configured/activated/indicated to a plurality of types of signals (channels/RSs). However, studies have not sufficiently been made on a method of determining a TCI state with respect to a plurality of cells/component carriers (CCs). Unless the method of determining is appropriate, degradation in communication quality, throughput reduction, and the like may occur.

In view of this, an object of the present disclosure is to provide a terminal, a radio communication method, and a base station that appropriately determine a TCI state with respect to a plurality of cells/CCs.

Solution to Problem

A terminal according to an aspect of the present disclosure includes: a receiving section that receives an indication of one or more transmission configuration indication (TCI) states for at least one of downlink and uplink, with respect to one of a plurality of cells for carrier aggregation; and a control section that applies the one or more TCI states to a part or all of the plurality of cells.

Advantageous Effects of Invention

An aspect of the present disclosure allows a TCI state with respect to a plurality of cells/CCs to be appropriately determined.

BRIEF DESCRIPTION OF DRAWINGS

FIGS. 5A and 5B are diagrams to show examples of joint TCI states and separate TCI states.

Figure 1:
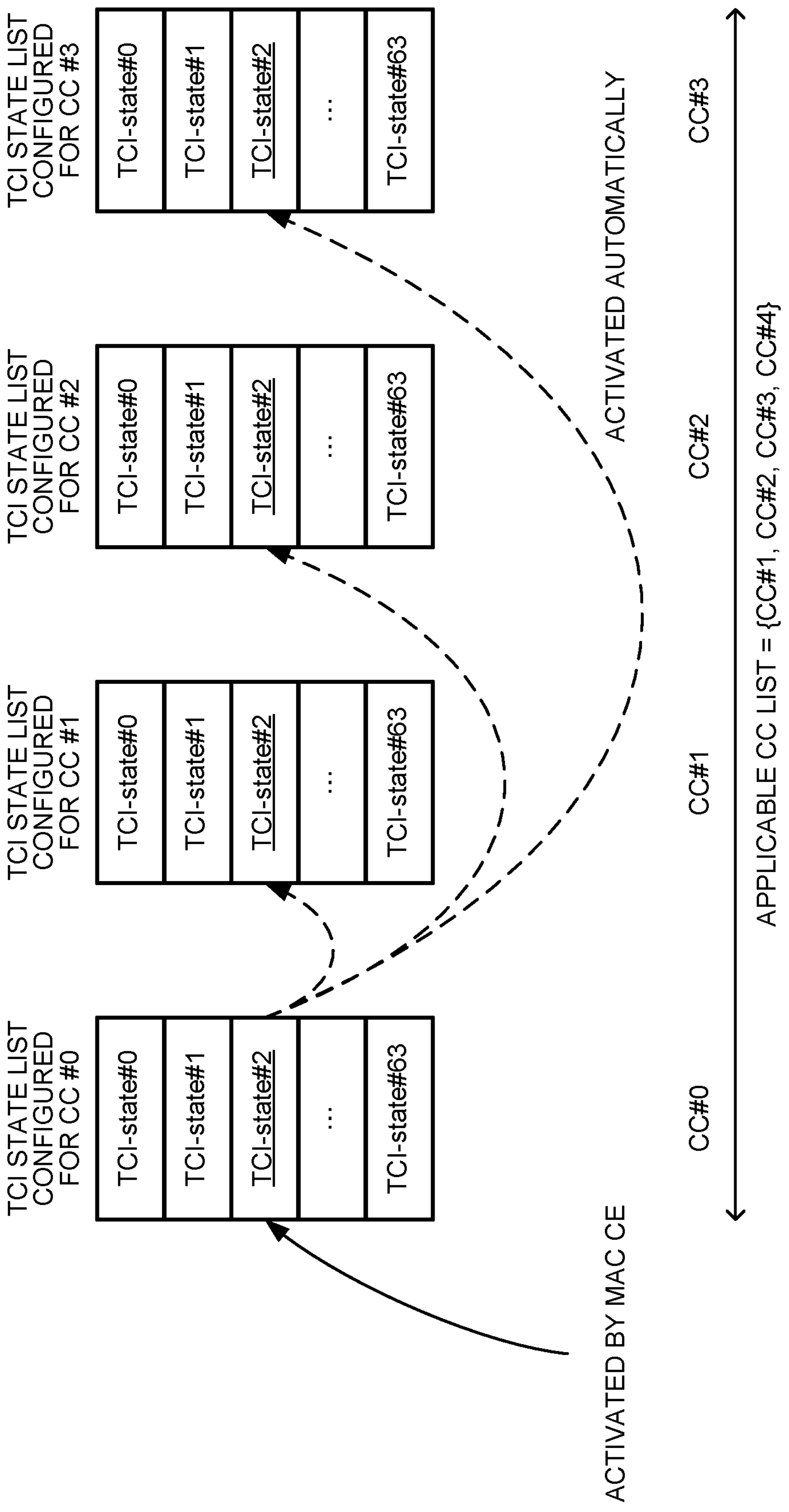
FIG. 1 is a diagram to show an example of simultaneous beam update on a plurality of CCs.

DESCRIPTION OF EMBODIMENTS (TCI, Spatial Relation, QCL)

For NR, control of reception processing (for example, at least one of reception, demapping, demodulation, and decoding) and transmission processing (for example, at least one of transmission, mapping, precoding, modulation, and coding) of at least one of a signal and a channel (expressed as a signal/channel) in a UE, based on a transmission configuration indication state (TCI state) is under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter (s)) are described below:

QCL type A (QCL-A): Doppler shift, Doppler spread, average delay, and delay spread QCL type B (QCL-B): Doppler shift and Doppler spread QCL type C (QCL-C): Doppler shift and Average delay QCL type D (QCL-D): Spatial reception parameter A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) by higher layer signaling or physical layer signaling, or a combination of these.

The physical layer signaling may be, for example, downlink control information (DCI).

A channel for which the TCI state or spatial relation is configured (specified) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), and a reference signal for QCL detection (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An RS of QCL type X in a TCI state may mean an RS in a relationship of QCL type X with (a DMRS of) a certain channel/signal, and this RS may be referred to as a QCL source of QCL type X in the TCI state.

(Simultaneous Beam Update on Plurality of CCs)

In Rel. 16, one MAC CE is possible to update beam indices (TCI states) of a plurality of CCs.

The UE can be configured with up to two applicable CC lists (for example, applicable-CC-list) by RRC. When two applicable CC lists are configured, the two applicable CC lists may correspond to intra-band CA in FR1 and intra-band CA in FR2.

A network may transmit a MAC CE for TCI state activation/deactivation for UE-specific PDSCH (TCI States Activation/Deactivation for UE-specific PDSCH MAC CE) to activate and deactivate a configured TCI state for a serving cell or a set of serving cells configured in a simultaneous TCI update list 1 (simultaneousTCI-UpdateList1) or a simultaneous TCI update list 2 (simultaneousTCI-UpdateList2). If an indicated serving cell is configured as a part of the simultaneous TCI update list 1 or the simultaneous TCI update list 2, the MAC CE is applied to every serving cell configured in the set in the simultaneous TCI update list 1 or the simultaneous TCI update list 2.

The network may transmit a MAC CE for TCI state indication for UE-specific PDCCH (TCI States Indication for UE-specific PDCCH MAC CE) to indicate a configured TCI state for a serving cell or a set of serving cells configured in the simultaneous TCI update list 1 (simultaneousTCI-UpdateList1) or the simultaneous TCI update list 2 (simultaneousTCI-UpdateList2). If an indicated serving cell is configured as a part of the simultaneous TCI update list 1 or the simultaneous TCI update list 2, the MAC CE is applied to every serving cell configured in the set in the simultaneous TCI update list 1 or the simultaneous TCI update list 2.

An activation MAC CE for a TCI state of a PDCCH activates TCI states associated with the same CORESET ID in all the BWPs/CCs in an applicable CC list.

An activation MAC CE for a TCI state of a PDSCH activates TCI states in all the BWPs/CCs in the applicable CC list.

An activation MAC CE for a spatial relation of an A-SRS/SP-SRS activates spatial relations associated with the same SRS resource ID in all the BWPs/CCs in the applicable CC list.

In an example in FIG. 1, a UE is configured with an applicable CC list indicating CCs #0, #1, #2, and #3 and a list indicating 64 TCI states for a CORESET or a PDSCH of each of the CCs. When one TCI state for CC #0 is activated by a MAC CE, the corresponding TCI states are activated in CCs #1, #2, and #3.

It is studied that such simultaneous beam update is applicable only to a single-TRP case.

For a PDSCH, the UE may be based on Procedure A below.

[Procedure A]

The UE receives an activation command for mapping of up to eight TCI states to a codepoint in a DCI field (TCI field) in one CC/DL BWP or in one set of CCs/BWPs. When one set of TCI state IDs is activated for one set of CCs/DL BWPs, an applicable CC list is then determined by a CC indicated in the activation command, and the same set of TCI states is applied to every DL BWP in the indicated CC. Only if the UE is not provided with a plurality of different values of CORESET pool indices (CORESETPoolIndex) in a CORESET information element (ControlResourceSet) and is not provided with at least one TCI codepoint mapped to two TCI states, the one set of TCI state IDs is possible to be activated for one set of CCs/DL BWPs.

For a PDCCH, the UE may be based on Procedure B below.

[Procedure B]

If the UE is provided with up to two lists of cells for simultaneous TCI state activation with use of a simultaneous TCI update list (at least one of simultaneousTCI-UpdateList-r16 and simultaneousTCI-UpdateListSecond-r16), by a simultaneous TCI cell list (simultaneousTCI-CellList), the UE applies, to a CORESET with an index p in every configured DL BWP in every configured cell in one list determined based on a serving cell index provided by a MAC CE command, an antenna port quasi co-location (QCL) provided by TCI states with the same activated TCI state ID value. Only if the UE is not provided with a plurality of different values of CORESET pool indices (CORESETPoolIndex) in a CORESET information element (ControlResourceSet) and is not provided with at least one TCI codepoint mapped to two TCI states, a simultaneous TCI cell list for simultaneous TCI state activation is possible to be provided.

For a semi-persistent (SP)/aperiodic (AP)-SRS, the UE may be based on Procedure C below.

[Procedure C]

For one set of CCs/BWPs, when spatial relation information (spatialRelationInfo) for an SP or AP-SRS resource configured by an SRS resource information element (higher layer parameter SRS-Resource) is activated/updated by a MAC CE, an applicable CC list is then indicated by a simultaneous spatial update list (higher layer parameter simultaneousSpatial-UpdateList-r16 or simultaneousSpatial-UpdateListSecond-r16), and the spatial relation information is applied to SP or AP-SRS resources with the same SRS resource ID in every BWP in the indicated CC. Only if the UE is not provided with a plurality of different values of CORESET pool indices (CORESETPoolIndex) in a CORESET information element (ControlResourceSet) and is not provided with at least one TCI codepoint mapped to two TCI states, spatial relation information (spatialRelationInfo) for the SP or AP-SRS resource configured by the SRS resource information element (higher layer parameter SRS-Resource) is activated/updated by an MAC CE for the one set of CCs/BWPs.

The simultaneous TCI cell list (simultaneousTCI-CellList) and the simultaneous TCI update list (at least one of simultaneousTCI-UpdateList1-r16 and simultaneousTCI-UpdateList2-r16) are lists of serving cells for which the TCI relations can be updated simultaneously by using a MAC CE. simultaneousTCI-UpdateList1-r16 and simultaneousTCI-UpdateList2-r16 do not include the same serving cell.

The simultaneous spatial update list (at least one of higher layer parameters simultaneousSpatial-UpdatedList1-r16 and simultaneousSpatial-UpdatedList2-r16) is a list of serving cells for which the spatial relations can be updated simultaneously by using a MAC CE. simultaneousSpatial-UpdatedList1-r16 and simultaneousSpatial-UpdatedList2-r16 do not include the same serving cell.

Here, a simultaneous TCI update list and a simultaneous spatial update list are configured by RRC, a CORESET pool index of a CORESET is configured by RRC, and a TCI codepoint mapped to TCI state(s) is indicated by a MAC CE.

In the present disclosure, a CC list, a new CC list, a simultaneous TCI cell list, a simultaneous TCI update list, simultaneousTCI-CellList, simultaneousTCI-UpdateList1-r16, simultaneousTCI-UpdateList2-r16, a simultaneous spatial update list, simultaneousSpatial-UpdatedList, simultaneousSpatial-UpdatedList1-r16, and simultaneousSpatial-UpdatedList2-r16 may be interchangeably interpreted.

In the present disclosure, simultaneousTCI-UpdateList1, simultaneousTCI-UpdateList1-r16, and simultaneousTCI-UpdateList-r16 may be interchangeably interpreted. In the present disclosure, simultaneousTCI-UpdateList2, simultaneousTCI-UpdateList2-r16, and simultaneousTCI-UpdateListSecond-r16 may be interchangeably interpreted.

In the present disclosure, simultaneousSpatial-UpdatedList1, simultaneousSpatial-UpdatedList1-r16, and simultaneousSpatial-UpdateList-r16 may be interchangeably interpreted. In the present disclosure, simultaneousSpatial-UpdatedList2, simultaneousSpatial-UpdatedList2-r16, and simultaneousSpatial-UpdateListSecond-r16 may be interchangeably interpreted.

(Unified/Common TCI Framework)

With a unified TCI framework, UL and DL channels are possible to be controlled by a common framework. The unified TCI framework may indicate a common beam (common TCI state) and apply the common beam to all the UL and DL channels, instead of defining a TCI state or a spatial relation for each channel as in Rel. 15, or may apply a common beam for UL to all the UL channels while applying a common beam for DL to all the DL channels.

One common beam for both DL and UL or a common beam for DL and a common beam for UL (two common beams in total) are under study.

The UE may assume the same TCI state (joint TCI state, joint TCI pool, joint common TCI pool, joint TCI state set) for UL and DL. The UE may assume respective different TCI states (separate TCI states, separate TCI pools, UL separate TCI pool and DL separate TCI pool, separate common TCI pools, UL common TCI pool and DL common TCI pool) for UL and DL.

By beam management based on a MAC CE (MAC CE level beam indication), default UL and DL beams may be aligned. A default TCI state of a PDSCH may be updated to align the beams to a default UL beam (spatial relation).

By beam management based on DCI (DCI level beam indication), a common beam/unified TCI state may be indicated from the same TCI pool (joint common TCI pool, joint TCI pool, set) for both UL and DL. X (>1) TCI states may be activated by a MAC CE. UL/DL DCI may select one from the X active TCI states. The selected TCI state may be applied to channels/RSs for both UL and DL.

The TCI pool (set) may be a plurality of TCI states configured by an RRC parameter or may be a plurality of TCI states (active TCI states, active TCI pool, set) activated by a MAC CE among the plurality of TCI states configured by the RRC parameter. Each TCI state may be a QCL type A/D RS. As the QCL type A/D RS, an SSB, a CSI-RS, or an SRS may be configured.

The number of TCI states corresponding to each of one or more TRPs may be defined. For example, the number N (21) of TCI states (UL TCI states) applied to channels/RSs for UL and the number M (≥1) of TCI states (DL TCI states) applied to channels/RSs for DL may be defined. At least one of N and M may be notified/configured/indicated for the UE through higher layer signaling/physical layer signaling.

In the present disclosure, when N=M=X (X is any integer) is described, this may mean that X (corresponding to X TRPs) TCI states (joint TCI states) common to UL and DL are notified/configured/indicated for the UE. When N=X (X is any integer) and M=Y (Y is any integer and Y may be Y=X) are described, this may mean that X (corresponding to X TRPs) UL TCI states and Y (corresponding to Y TRPs) DL TCI states (in other words, separate TCI states) are notified/configured/indicated for the UE.

For example, when N=M=1 is described, this may mean that one TCI state common to UL and DL for a single TRP is notified/configured/indicated for the UE (a joint TCI state for a single TRP).

For example, when N=1 and M=1 are described, this may mean that one UL TCI state and one DL TCI state for a single TRP are separately notified/configured/indicated for the UE (separate TCI states for a single TRP).

For example, when N=M=2 is described, this may mean that a plurality of (two) TCI states common to UL and DL for a plurality of (two) TRPs are notified/configured/indicated for the UE (joint TCI states for a plurality of TRPs).

For example, when N=2 and M=2 are described, this may mean that a plurality of (two) UL TCI states and a plurality of (two) DL TCI states for a plurality of (two) TRPs are notified/configured/indicated for the UE (separate TCI states for a plurality of TRPs).

Note that, in the example described above, although a case is described in which the value of each of N and M is 1 or 2, the value of each of N and M may be 3 or greater and N may be different from M.

Figure 2A:
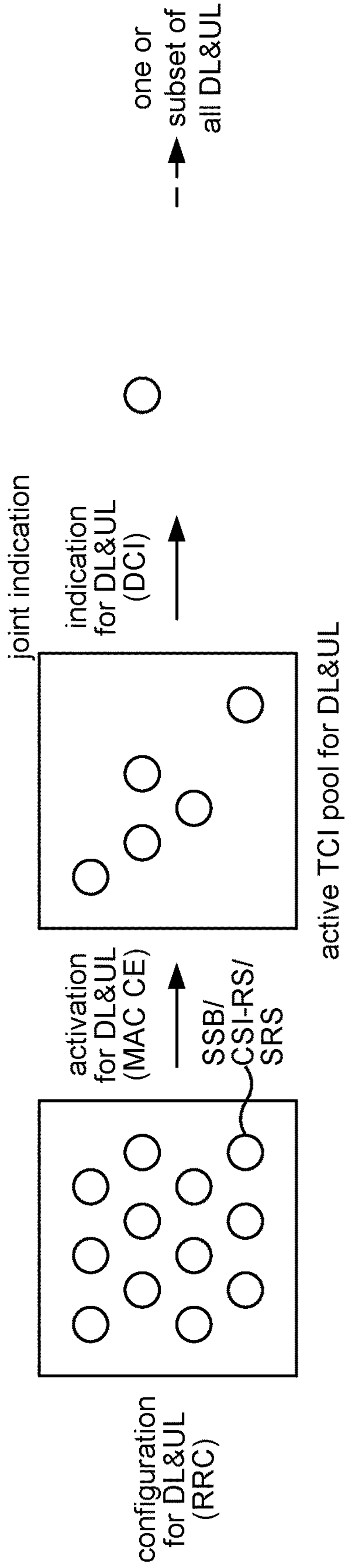
FIGS. 2A and 2B are each a diagram to show an example of a unified/common TCI framework.

In an example in FIG. 2A, an RRC parameter (information element) configures a plurality of TCI states for both DL and UL. A MAC CE may activate a plurality of TCI states among the plurality of configured TCI states. DCI may indicate one of the plurality of activated TCI states. The DCI may be UL/DL DCI. The indicated TCI state may be applied to at least one (or all) of UL/DL channels/RSs. One piece of DCI may indicate both a UL TCI and a DL TCI.

In the example in FIG. 2A, one dot may be one TCI state to be applied to both UL and DL or may be two respective TCI states to be applied to UL and DL.

The plurality of TCI states configured by the RRC parameter and/or the plurality of TCI states activated by the MAC CE may be referred to as a TCI pool (common TCI pool, joint TCI pool, TCI state pool). The plurality of TCI states activated by the MAC CE may be referred to as an active TCI pool (active common TCI pool).

Note that, in the present disclosure, a higher layer parameter (RRC parameter) that configures a plurality of TCI states may be referred to as configuration information that configures the plurality of TCI states or simply as the "configuration information." In the present disclosure, one of a plurality of TCI states being indicated by using DCI may refer to receiving indication information indicating the one of the plurality of TCI states included in the DCI or may simply refer to receiving the "indication information."

Figure 2B:
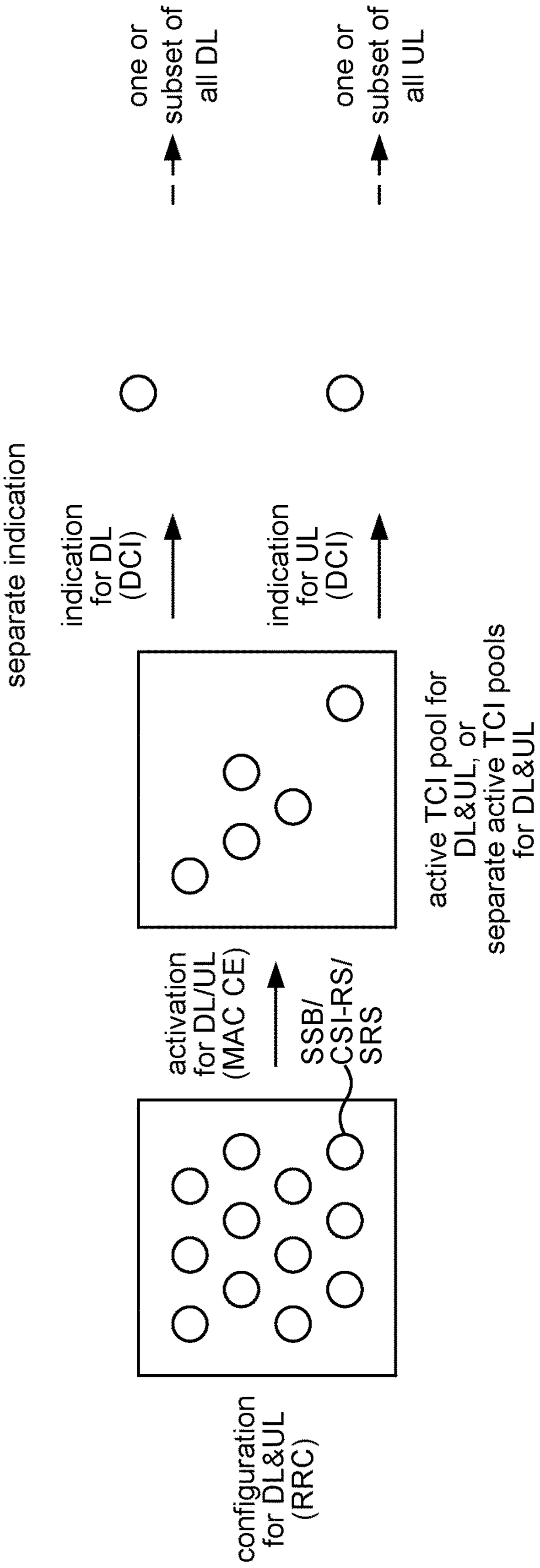

In an example in FIG. 2B, an RRC parameter configures a plurality of TCI states for both DL and UL (joint common TCI pool). A MAC CE may activate a plurality of TCI states (active TCI pool) among the plurality of configured TCI states. Respective (different, separate) active TCI pools for UL and DL may be configured/activated.

DL DCI or a new DCI format may select (indicate) one or more (for example, one) TCI states. The selected TCI state(s) may be applied to one or more (or all) DL channels/RSs. The DL channels may be PDCCHs/PDSCHs/CSI-RSs. The UE may determine a TCI state of each of the DL channels/RSs by using operation of a TCI state (TCI framework) in Rel. 16. UL DCI or a new DCI format may select (indicate) one or more (for example, one) TCI states. The selected TCI state(s) may be applied to one or more (or all) UL channels/RSs. The UL channels may be PUSCHs/SRSs/PUCCHs. As described above, different pieces of DCI may indicate a UL TCI and a DL DCI separately.

Existing DCI format 1_1/1_2 may be used for indication of a common TCI state.

A common TCI framework may include separate TCI states for DL and UL.

It is under study that, with respect to M=N=1 for a separate DL/UL TCI in the unified TCI framework in Rel. 17, one instance of a beam indication using DCI format 1_1/1_2 (with/without DL assignment) conforms to at least one of the following Beam Indication 1 to Beam Indication 3.

[Beam Indication 1] One TCI field codepoint expresses a pair of a DL TCI state and a UL TCI state. If DCI indicates such a TCI field codepoint, the UE applies the corresponding DL TCI state and UL TCI state.

[Beam Indication 2] One TCI field codepoint expresses only a DL TCI state. If DCI indicates such a TCI field codepoint, the UE applies the corresponding DL TCI state while maintaining a UL TCI state.

[Beam Indication 3] One TCI field codepoint expresses only a UL TCI state. If DCI indicates such a TCI field codepoint, the UE applies the corresponding UL TCI state while maintaining a DL TCI state.

In the present disclosure, a TCI state pool, a TCI state list, a unified TCI state pool, a joint TCI, a joint TCI state pool, a separate TCI state pool, a separate DL/UL TCI state pool, a DL TCI state pool, a UL TCI state pool, a separate DL TCI state pool, a separate UL TCI state pool, and a separate UL TCI may be interchangeably interpreted.

(Unified TCI Framework in Carrier Aggregation (CA))

For the unified TCI framework in Rel. 17, with respect to update and activation of a common TCI state ID for provision of at least one of common QCL information for a UE-dedicated PDCCH/PDSCH and a common UL TX spatial filter for a UE-dedicated PUSCH/PUCCH over sets of a plurality of CCs/plurality of BWPs, the following Assumption 1-1 to Assumption 1-4 are under study.

[Assumption 1-1]

A TCI state pool to be configured by RRC configuration may be configured in a PDSCH configuration (PDSCH-Config) for each BWP/CC, as in Rel. 15/16. The TCI state pool configuration configured by RRC configuration as above does not imply that a separate DL/UL TCI state pool is excluded or supported.

[Assumption 1-2]

A TCI state pool to be configured by RRC configuration may not be in a PDSCH configuration (PDSCH-Config) for each BWP/CC, and may be replaced with a reference to a TCI state pool to be configured by RRC configuration in a reference BWP/CC. In the PDSCH configuration (PDSCH-Config) in the reference BWP/CC, the TCI state pool to be configured by RRC configuration is configured. For a BWP/CC with the PDSCH configuration including the reference to the TCI state pool to be configured by RRC configuration in the reference BWP/CC, the UE applies the TCI state pool configured by RRC configuration in the reference BWP/CC.

[Assumption 1-3]

When no BWP/CC ID (bwp-Id/cell) is present for a source RS of QCL type A/D in QCL information (QCL-Info) in a TCI state, the UE assume that a source 1-RS of QCL type A/D is present in a BWP/CC to which the TCI state is to be applied.

[Assumption 1-4]

A UE capability is introduced for reporting of a maximum number of TCI state pools supported over a plurality of BWPs and a plurality of CCs in a band, and the candidate value for the UE capability at least includes 1.

For the unified TCI framework in Rel. 17, with respect to update and activation of a common TCI state ID for provision of at least one of common QCL information for a UE-dedicated PDCCH/PDSCH and a common UL TX spatial filter for a UE-dedicated PUSCH/PUCCH over sets of a plurality of CCs/plurality of BWPs, the following Assumption 2-1 to Assumption 2-3 are under study.

[Assumption 2-1]

For a target CC, a source RS determined from a common TCI state ID indicated for provision of a QCL type D indication and determination of a UL TX spatial filter may be configured in the target CC or another CC.

[Assumption 2-2]

For intra-band CA, the following Configuration 1 to Configuration 2 may be supported without any additional QCL rule.

[[Configuration 1]] For a set of CCs configured, one source RS over a plurality of CCs may be determined from the common TCI state ID indicated for provision of the QCL type D indication and determination of the UL TX spatial filter.

[[Configuration 2]] For a set of CCs configured, one source RS for each CC may be determined from the common TCI state ID indicated for provision of the QCL type D indication and determination of the UL TX spatial filter. A plurality of CC-specific source RSs may be associated with the same QCL type D RS.

[Assumption 2-3]

A set of CCs/BWPs configured includes all the BWPs in the CCs configured.

In CA, a CC-specific TCI state pool/configuration (Case 1) and a CC-common TCI state pool/configuration (Case 2) may be supported.

[Case 1]

Figure 3A:
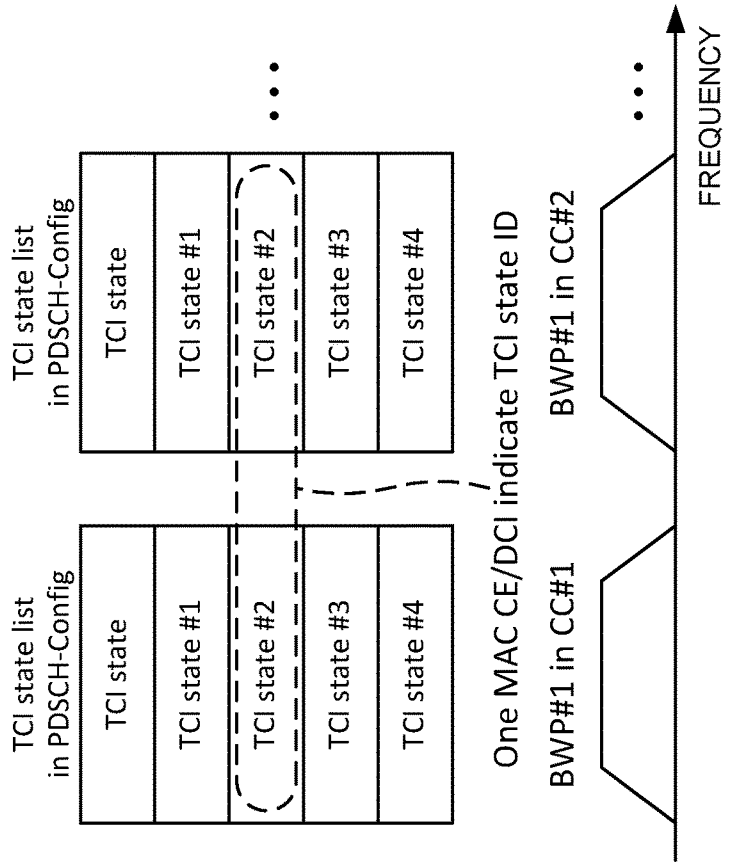
FIGS. 3A and 3B are diagrams to show examples of a CC-specific TCI state pool and a CC-common TCI state pool.

FIG. 3A shows an example of a CC-specific TCI state pool. In this example, a TCI state list in a PDSCH configuration is configured for BWP 1 in CC 1, and a TCI state list in a PDSCH configuration is configured for BWP 1 in CC 2. One MAC CE/DCI indicates a TCI state ID.

[Case 2]

Figure 3B:
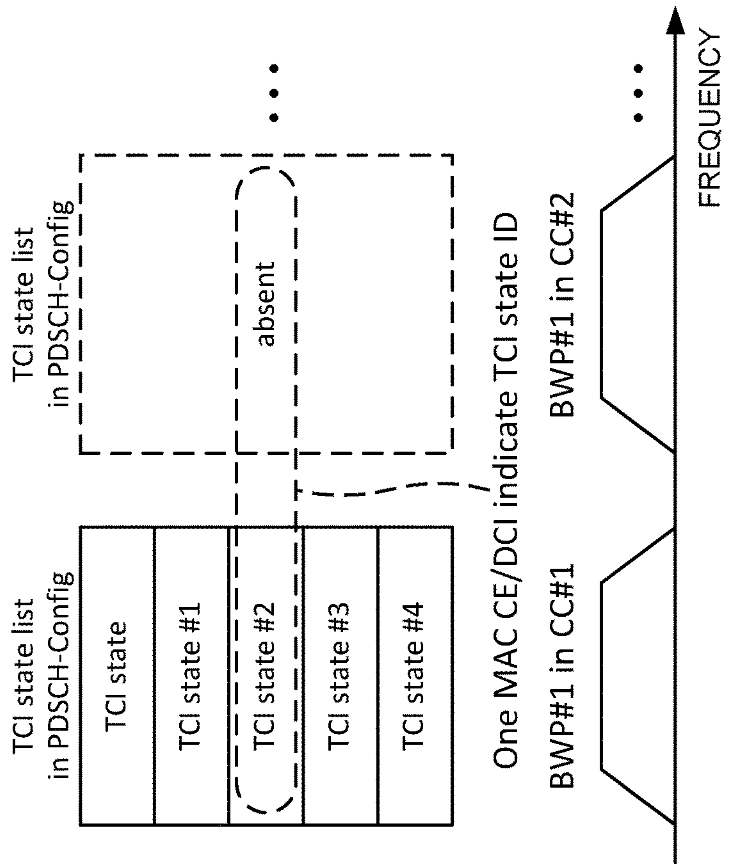

FIG. 3B shows an example of a CC-common TCI state pool. In this example, a TCI state list in a PDSCH configuration is configured for BWP 1 in CC 1, and a TCI state list in a PDSCH configuration is absent for BWP 1 in CC 2. One MAC CE/DCI indicates a TCI state ID (for example, TCI state #2).

A set of CCs/BWPs configured may be configured by a CC list or may not be indicated explicitly.

(Beam Application Time (BAT))

For a DCI-based beam indication in Rel. 17, regarding an application time of a beam indication (BAT), the following Study 1 and Study 2 are under study.

[Study 1]

Figure 4:
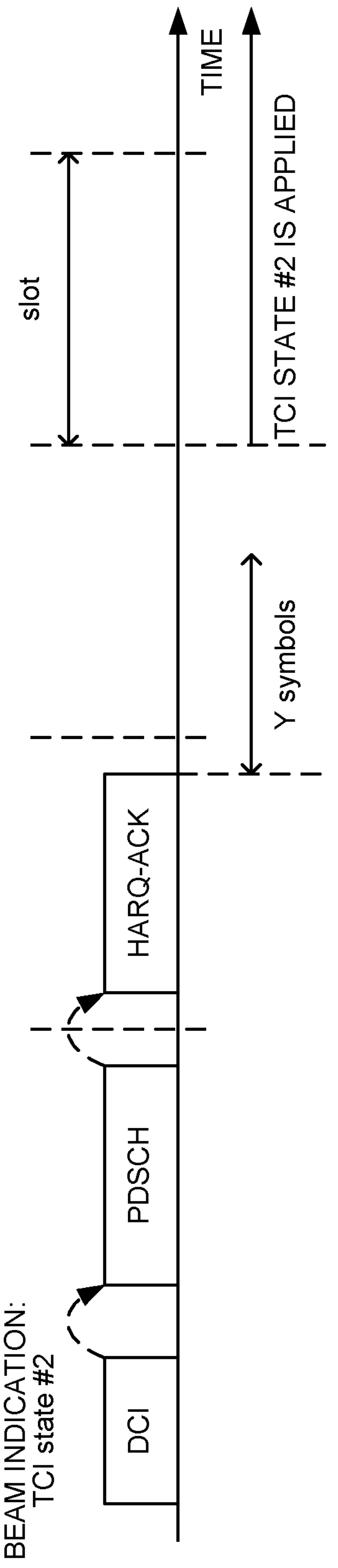
FIG. 4 is a diagram to show an example of a beam indication application time (BAT).

It is under study that the first slot to which an indicated TCI is to be applied is after at least Y symbols from the last symbol of an acknowledgement (ACK) in response to a joint or separate DL/UL beam indication (FIG. 4). Y symbols may be configured by a base station on the basis of a UE capability. The UE capability may be reported in symbol units.

According to Study 1, a BAT is determined based on Y symbols. When SCSs are different between a plurality of CCs, values of Y symbols are also different, thus BATs are different between the plurality of CCs.

[Study 2]

For a case of CA, the application time of the beam indication may conform to any one of the following Choice 1 to Choice 3.

[Choice 1] Both of the first slot and Y symbols are determined in a carrier with the minimum SCS among one or more carriers to which the beam indication is to be applied.

[Choice 2] Both of the first slot and Y symbols are determined in a carrier with the minimum SCS among one or more carriers to which the beam indication is to be applied and UL carriers that carry the ACK of the beam indication.

[Choice 3] Both of the first slot and Y symbols are determined in a UL carrier that carries the ACK of the beam indication.

According to Study 2, BATs between a plurality of CCs are in common.

In CA, when beams are different between a plurality of CCs, the UE is not possible to appropriately perform transmission/reception. In Rel-15/16 CA, the UE is possible to perform transmission/reception when the beams for all the CCs are the same. For example, in CA using CC #1 and CC #2, CC #1 uses TCI state #1 and CC #2 also uses TCI state #1. In multi-TRP of CA using CC #1 and CC #2, CC #1 uses TCI states #1 and #2 and CC #2 also uses TCI states #1 and #2.

As a CC simultaneous beam update function in Rel. 17, it is under study that the beam is made common to those between a plurality of CCs in CA.

However, a method of determining/applying a TCI state with respect to a plurality of cells/CCs/BWPs is not clear. Unless such a method of determining is clear, degradation in throughput/communication quality may occur.

In view of this, the inventors of the present invention came up with the idea of a method of determining a TCI state with respect to a plurality of cells/CCs/BWPs.

Embodiments according to the present disclosure will be described in detail with reference to the drawings as follows. The radio communication methods according to respective embodiments may each be employed individually, or may be employed in combination.

In the present disclosure, "A/B" and "at least one of A and B" may be interchangeably interpreted. In the present disclosure, "A/B/C" may mean "at least one of A, B, and C".

In the present disclosure, activate, deactivate, indicate, select, configure, update, determine, and the like may be interchangeably interpreted. In the present disclosure, "support," "control," "controllable," "operate," "operable," and the like may be interchangeably interpreted.

In the present disclosure, radio resource control (RRC), an RRC parameter, an RRC message, a higher layer parameter, an information element (IE), a configuration, and the like may be interchangeably interpreted. In the present disclosure, a Medium Access Control control element (MAC Control Element (CE)), an update command, an activation/deactivation command, and the like may be interchangeably interpreted.

In the present disclosure, the higher layer signaling may be, for example, any one or combinations of Radio Resource Control (RRC) signaling, Medium Access Control (MAC) signaling, broadcast information, and the like.

In the present disclosure, the MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

In the present disclosure, the physical layer signaling may be, for example, downlink control information (DCI), uplink control information (UCI), or the like.

In the present disclosure, an index, an identifier (ID), an indicator, a resource ID, and the like may be interchangeably interpreted. In the present disclosure, a sequence, a list, a set, a group, a cluster, a subset, and the like may be interchangeably interpreted.

In the present disclosure, a panel, a UE panel, a panel group, a beam, a beam group, a precoder, an Uplink (UL) transmission entity, a transmission/reception point (TRP), a base station, spatial relation information (SRI), a spatial relation, an SRS resource indicator (SRI), a control resource set (CORESET), a Physical Downlink Shared Channel (PDSCH), a codeword (CW), a transport block (TB), a reference signal (RS), an antenna port (for example, a demodulation reference signal (DMRS) port), an antenna port group (for example, a DMRS port group), a group (for example, a spatial relation group, a code division multiplexing (CDM) group, a reference signal group, a CORESET group, a Physical Uplink Control Channel (PUCCH) group, a PUCCH resource group), a resource (for example, a reference signal resource, an SRS resource), a resource set (for example, a reference signal resource set), a CORESET pool, a downlink Transmission Configuration Indication state (TCI state) (DL TCI state), an uplink TCI state (UL TCI state), a unified TCI state, a common TCI state, quasi-co-location (QCL), QCL assumption, and the like may be interchangeably interpreted.

In the present disclosure, a common beam, a common TCI, a common TCI state, a unified TCI, a unified TCI state, a TCI state applicable to DL and UL, a TCI state applied to a plurality of (plurality of types of) channels/RSs, a TCI state applicable to a plurality of types of channels/RSs, and a PL-RS may be interchangeably interpreted.

In the present disclosure, a plurality of TCI states configured by RRC, a plurality of TCI states activated by a MAC CE, a pool, a TCI state pool, an active TCI state pool, a common TCI state pool, a joint TCI state pool, a separate TCI state pool, a common TCI state pool for UL, a common TCI state pool for DL, a common TCI state pool configured/activated by RRC/MAC CE, and TCI state information may be interchangeably interpreted.

In the present disclosure, DL TCI, DL only TCI, separate DL only TCI, DL common TCI, DL unified TCI, common TCI, and unified TCI may be interchangeably interpreted. In the present disclosure, UL TCI, UL only TCI, separate UL only TCI, UL common TCI, UL unified TCI, common TCI, and unified TCI may be interchangeably interpreted.

In the present disclosure, a separate TCI state being configured/indicated/updated, a DL only TCI state being configured/indicated, a UL only TCI state being configured/indicated/updated, and DL and UL TCI states being configured/indicated/updated may be interchangeably interpreted.

In the present disclosure, a case of a joint TCI pool and a case where a joint TCI pool is configured may be interchangeably interpreted. In the present disclosure, a case of a separate TCI pool and a case where a separate TCI pool is configured may be interchangeably interpreted.

In the present disclosure, a case where a joint TCI pool is configured, a case where a TCI pool configured for DL and a TCI pool configured for UL are in common, a case where a TCI pool for both DL and UL is configured, and a case where one TCI pool (one set of TCIs) is configured may be interchangeably interpreted.

In the present disclosure, a case where a separate TCI pool is configured, a case where a TCI pool configured for DL and a TCI pool configured for UL are different from each other, a case where a TCI pool for DL (first TCI pool, first TCI set) and a TCI pool for UL (second TCI pool, second TCI set) are configured, a case where a plurality of TCI pools (plurality of sets of TCIs) are configured, and a case where a TCI pool for DL is configured may be interchangeably interpreted. When a TCI pool for DL is configured, a TCI pool for UL may be equal to the configured TCI pool.

In the present disclosure, a channel/RS to which a common TCI is applied may be a PDSCH/HARQ-ACK information/PUCCH/PUSCH/CSI-RS/SRS.

In the present disclosure, an indicated CC (cell), an indicated CC (cell)/BWP, and a CC (cell)/BWP indicated by a MAC CE may be interchangeably interpreted. In the present disclosure, a CC (cell) and a CC (cell)/BWP may be interchangeably interpreted.

In the present disclosure, a TCI state, a unified TCI state, a joint TCI state for DL and UL, a TCI state for UL and DL for a joint TCI indication, a separate TCI state for DL/UL, a UL only TCI state for a separate TCI indication, and a DL only TCI state for a separate TCI indication may be interchangeably interpreted.

(Radio Communication Method)

In the present disclosure, a unified TCI state may be referred to as a TCI state simply.

As a new RRC parameter, a unified TCI state/a unified TCI state list/a unified TCI state pool may be introduced. As a new RRC parameter, a new BWP/CC list indicating a set of BWPs/CCs may be introduced.

First Embodiment

This embodiment relates to a CC list (a set of BWPs/CCs to be configured).

Aspect 1-1

A CC list (common CC list) common to a joint TCI state for DL and UL, a DL TCI state, and a UL TCI state may be configured/determined.

When any one of the joint TCI state for DL and UL, the DL TCI state, and the UL TCI state is indicated by an RRC IE/MAC CE/DCI, the UE may update/determine a TCI state for a plurality of BWPs/CCs by using the common CC list.

Aspect 1-2

Respective different CC lists (dedicated CC lists) may be configured/determined for a joint TCI state for DL and UL, a DL TCI state, and a UL TCI state.

When the joint TCI state for DL and UL is configured/activated/indicated by an RRC IE/MAC CE/DCI, the UE may update/determine/apply a TCI state for a plurality of BWPs/CCs by using the CC list related to the joint TCI state for DL and UL.

When the DL TCI state is configured/activated/indicated by an RRC IE/MAC CE/DCI, the UE may update/determine/apply a TCI state for a plurality of BWPs/CCs by using the CC list related to the DL TCI state.

When the UL TCI state is configured/activated/indicated by an RRC IE/MAC CE/DCI, the UE may update/determine/apply a TCI state for a plurality of BWPs/CCs by using the CC list related to the UL TCI state.

A CC list common to the joint TCI state for DL and UL and the DL TCI state may be configured/determined.

The CC list need not be notified/configured explicitly. For example, when no CC list is notified explicitly, the UE may determine, as a CC list, every CC in the same band.

A plurality of CC lists may be configured. The number of CC lists may be two, or may be more than two. CCs included in the plurality of CC lists may be defined not to overlap with each other.

This embodiment allows a set of BWPs/CCs to be appropriately configured/determined.

Second Embodiment

This embodiment relates to Study 2 described above.

A trigger for Study 2 described above is to align beams with the same QCL type D RS beam for all the CCs in CA, and the UE is possible to appropriately receive a PDSCH over a plurality of CCs in CA. However, "for a case of CA" is not clear. In other words, for a given CC, regardless of CA or non-CA, whether the same BAT is applied is not clear. This is because whether the case is CA or non-CA depends on dynamic scheduling of a PDSCH/PUSCH on each slot. According to Study 2, the BAT for the given CC may be dynamically changed for each slot, depending on the dynamic scheduling of the PDSCH/PUSCH. In this case, the processing load for the UE is increased. For example, the BAT in CC #1 is different between a case of performing CA using CC #1 and CC #2 and a case of not performing CA using CC #1 and CC #2.

Study 2 may conform to any one of the following Choice A and Choice B.

[Choice A] For a given CC, regardless of CA or non-CA, the same BAT is applied. "for a case of CA" in Study 2 may be interpreted as "for a set of BWPs/CCs to be configured".

[Choice B] For a given CC, regardless of CA or non-CA, a different BAT is applied. For a case of non-CA, the BAT may be dynamically changed depending on the dynamic scheduling of the PDSCH/PUSCH.

For the purpose of aligning BATs with each other over a plurality of CCs for PDSCH or aligning BATs with each other over a plurality of CCs for PUSCH, each BAT may, for a set of BWPs/CCs, conform to Choice 1 described above. Here, "a set of BWPs/CCs" may be interpreted as "BWPs/CCs configured by a higher layer (RRC)", or may be interpreted as "BWPs/CCs configured with CA by a higher layer (RRC)". In this case, a CC for determination of the BAT does not dynamically change.

This embodiment allows a BAT to be appropriately determined.

Third Embodiment

This embodiment relates to a BAT for UL/DL.

In a case of a separate TCI state, whether to apply the same BAT for a UL CC and a DL CC or apply separate BATs for the UL CC and the DL CC is not clear.

Aspect 3-1

A common BAT is configured/defined/applied for DL (at least one of a joint TCI state for DL and UL and a DL TCI state) and UL (a UL TCI state).

When any one of a joint TCI state for DL and UL, a DL TCI state, and a UL TCI state is configured/activated/indicated by an RRC IE/MAC CE/DCI, the UE may determine a BAT common to UL and DL, on the basis of Study 1 and Study 2/second embodiment, and may update/determine/apply, in accordance with the timing of the BAT, any one of the joint TCI state for DL and UL, the DL TCI state, and the UL TCI state for each BWP/CC. In this case, operations of the UE are easier.

Aspect 3-2

Separate BATs are configured/defined/applied for DL (at least one of a joint TCI state for DL and UL and a DL TCI state) and UL (a UL TCI state).

When any one of a joint TCI state for DL and UL and a DL TCI state is configured/activated/indicated by an RRC IE/MAC CE/DCI, the UE may determine a BAT for DL, on the basis of Study 1 and Study 2/second embodiment, and may update/determine/apply, in accordance with the timing of the BAT, any one of the joint TCI state for DL and UL and the DL TCI state for each BWP/CC. In this case, the UE need not update the UL TCI state (the UE may maintain the UL TCI state).

When a UL TCI state is configured/activated/indicated by an RRC IE/MAC CE/DCI, the UE may determine a BAT for UL, on the basis of Study 1 and Study 2/second embodiment, and may update/determine/apply, in accordance with the timing of the BAT, the UL TCI state for each BWP/CC. In this case, the UE need not update the DL TCI state (the UE may maintain the DL TCI state).

In CA, transmissions/receptions for UL and DL are not simultaneously performed, and thus the BAT for UL CC and the BAT for DL CC need not be aligned. In time-division multiplexing (TDD) as well, regarding BATs for CCs in CA, it is sufficient to align BATs for UL with each other between the CCs and align BATs for DL with each other between the CCs at least (in other words, the BATs for UL need not be aligned with the BATs for DL between the CCs). In particular, when CA using a plurality of SCSs is performed for one of DL and UL and CA using one SCS is performed for the other of DL and UL (for example, CA between frequency ranges (FRs) (FR1-FR2 CA)), for example, when CA using a plurality of SCSs is performed in DL and CA using a single SCS is performed in UL, a BAT derived from the plurality of SCSs (for example, the minimum SCS) in DL is sufficient to be used for all the CCs, between the CCs performing CA for DL. Between CCs performing CA for UL, a BAT derived from the single SCS in UL is sufficient to be used for all the CCs. With this, in CA for either of DL or UL (UL in the example described above) using one SCS, the BAT is possible to be prevented from being longer than necessary.

Aspect 3-3

Separate BATs are configured/defined/applied for a joint TCI state for DL and UL, a DL TCI state, and a UL TCI state.

When the joint TCI state for DL and UL is configured/activated/indicated by an RRC IE/MAC CE/DCI, the UE may determine a BAT for the joint TCI state for DL and UL, on the basis of Study 1 and Study 2/second embodiment, and may update/determine/apply, in accordance with the timing of the BAT, the joint TCI state for DL and UL for each BWP/CC.

When the DL TCI state is configured/activated/indicated by an RRC IE/MAC CE/DCI, the UE may determine a BAT for DL, on the basis of Study 1 and Study 2/second embodiment, and may update/determine/apply, in accordance with the timing of the BAT, the DL TCI state for each BWP/CC. In this case, the UE need not update the UL TCI state (the UE may maintain the UL TCI state).

When the UL TCI state is configured/activated/indicated by an RRC IE/MAC CE/DCI, the UE may determine a BAT for UL, on the basis of Study 1 and Study 2/second embodiment, and may update/determine/apply, in accordance with the timing of the BAT, the UL TCI state for each BWP/CC. In this case, the UE need not update the DL TCI state (the UE may maintain the DL TCI state).

When transmissions/receptions are not simultaneously performed in CA, the BAT for UL CC and the BAT for DL CC need not be aligned. When CA using a plurality of SCSs is performed for one of DL and UL and CA using one SCS is performed for the other of DL and UL (for example, CA between frequency ranges (FRs) (FR1-FR2 CA)), in the CA using one SCS, the BAT is possible to be prevented from being longer than necessary. In this case, the UE need not update the DL TCI state (the UE may maintain the DL TCI state).

This embodiment allows a BAT for UL/DL (link direction) to be appropriately determined.

Fourth Embodiment

This embodiment relates to a joint TCI state and a separate TCI state.

For each BWP/CC, which of a joint TCI state (a TCI state list for joint TCI indication) or a separate TCI state (a TCI state list for separate TCI indication) is to be applied may be configured (may be switched) by an RRC IE.

FIG. 5A shows an example of association between codepoints of a TCI state field and TCI states for DL and UL when a TCI state list for joint TCI indication is configured.

FIG. 5B shows an example of association between codepoints of a TCI state field, DL only TCI states, and UL only TCI states when a TCI state list for separate TCI indication is configured. Each codepoint may be associated only with a DL TCI state, may be associated only with a UL TCI state, or may be associated with both a DL TCI state and a UL TCI state.

Whether a separate TCI state and a joint TCI state are intermingled, in BWPs/CCs (a set of the BWPs/CCs) included in a CC list, is not clear.

Aspect 4-1

Only either one of the separate TCI state or the joint TCI state is configured, in every BWP/CC included in a CC list.

The UE may be defined not to assume that each of the separate TCI state and the joint TCI state is configured for a respective one of separate BWPs/CCs in BWPs/CCs included in a CC list.

Aspect 4-2

Each of the separate TCI state and the joint TCI state may be configured for a respective one of separate BWPs/CCs in BWPs/CCs included in a CC list. The UE may conform to at least one of the following Aspect 4-2-1 to Aspect 4-2-4.

Aspect 4-2-1

For a BWP/CC included in a CC list, when the separate TCI state is configured/activated/indicated by an RRC IE/MAC CE/DCI, the UE updates/determines a TCI state for every BWP/CC configured with the separate TCI state among BWPs/CCs included in the CC list.

Aspect 4-2-2

For a BWP/CC included in a CC list, when the separate TCI state is configured/activated/indicated by an RRC IE/MAC CE/DCI, the UE updates/determines a TCI state for every BWP/CC included in the CC list. Here, the UE need not distinguish a BWP/CC configured with the separate TCI state and a BWP/CC configured with the joint TCI state. For the BWP/CC configured with the joint TCI state by an RRC IE, the separate TCI state may be activated/indicated by a MAC CE/DCI using the simultaneous beam update function in the CC list.

Aspect 4-2-3

For a BWP/CC included in a CC list, when the joint TCI state is configured/activated/indicated by an RRC IE/MAC CE/DCI, the UE updates/determines a TCI state for every BWP/CC configured with the joint TCI state among BWPs/CCs included in the CC list.

Aspect 4-2-4

For a BWP/CC included in a CC list, when the joint TCI state is configured/activated/indicated by an RRC IE/MAC CE/DCI, the UE updates/determines a TCI state for every BWP/CC included in the CC list. Here, the UE need not distinguish a BWP/CC configured with the separate TCI state and a BWP/CC configured with the joint TCI state. For the BWP/CC configured with the separate TCI state by an RRC IE, the joint TCI state may be activated/indicated by a MAC CE/DCI using the simultaneous beam update function in the CC list.

This embodiment allows a separate TCI state/joint TCI state to be appropriately configured/activated/indicated/determined.

Other Embodiments

«UE Capability Information/Higher Layer Parameter»

A higher layer parameter (RRC IE)/UE capability corresponding to a function (characteristic, feature) in the embodiments described above may be defined. The higher layer parameter may indicate whether to enable the function. The UE capability may indicate whether the UE supports the function.

A UE configured with a higher layer parameter corresponding to the function may perform the function. "A UE not configured with a higher layer parameter corresponding to the function does not perform the function (for example, conforms to Rel. 15/16)" may be defined.

A UE having reported/transmitted a UE capability indicating the support for the function may perform the function. "A UE having not reported a UE capability indicating the support of the function does not perform the function (for example, conforms to Rel. 15/16)" may be defined.

When the UE reports/transmits the UE capability indicating support of the function and is configured with the higher layer parameter corresponding to the function, the UE may perform the function. "When the UE does not report/transmit the UE capability indicating the support of the function or is not configured with the higher layer parameter corresponding to the function, the UE does not perform the function (for example, conforms to Rel. 15/16)" may be defined.

What embodiment/option/choice/function in the plurality of embodiments described above is to be used may be configured by a higher layer parameter, may be reported as a UE capability by a UE, may be defined in a specification, or may be determined by the UE capability reported and the configuration by the higher layer parameter.

The UE capability may indicate whether to support a function of at least one of the following.

- A unified TCI framework
- Either one or both of a joint TCI and a separate TCI
- Either one or both of a CC-common TCI state pool and a CC-specific TCI state pool
- Either one or both of a CC-common RS and a CC-specific RS The UE capability may indicate a value of at least one of the following.

- The number (maximum number) of TCI states to be configured for each BWP/CC/band/UE

- The number (maximum number) of active TCI states for each BWP/CC/band/UE
- The number (maximum number) of TCI state pools (TCI state lists) over sets of BWPs/CCs
- Y [symbols] for a BAT common to a joint TCI state for DL and UL, a DL TCI state, and a UL TCI state
- Y [symbols] for a BAT for a joint TCI state for DL and UL
- Y [symbols] for a BAT for a DL TCI state
- Y [symbols] for a BAT for a UL TCI state According to the UE capability/higher layer parameter described above, the UE is possible to implement the above functions while maintaining compatibility with an existing specification.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 6:
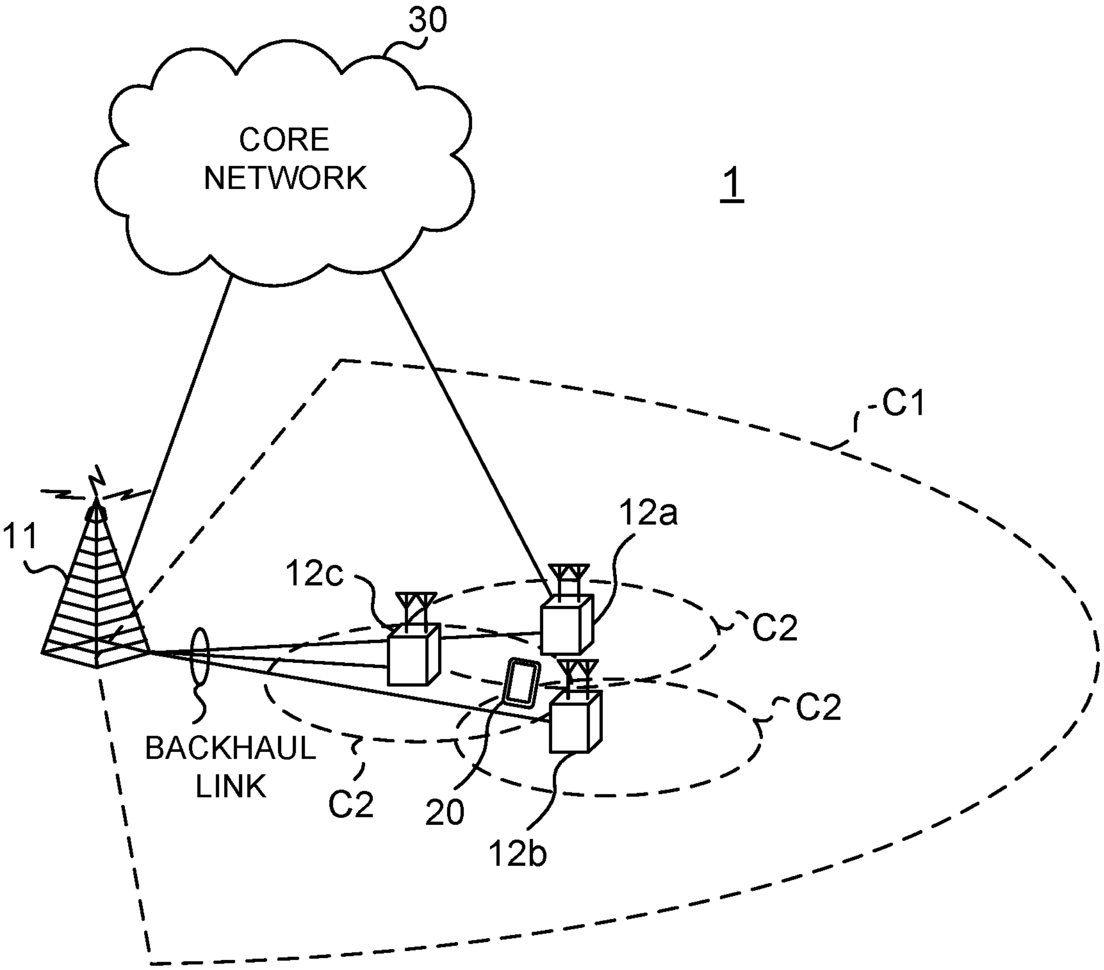
FIG. 6 is a diagram to show an example of a schematic structure of a radio communication system according to one embodiment.

FIG. 6 is a diagram to show an example of a schematic structure of the radio communication system according to one embodiment. The radio communication system 1 may be a system implementing a communication using Long Term Evolution (LTE), 5th generation mobile communication system New Radio (5G NR), and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12*a* to 12*c*) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHZ), and FR2 may be a frequency band which is higher than 24 GHZ (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface, and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a reference signal for measurement (Sounding Reference Signal (SRS)), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 7:
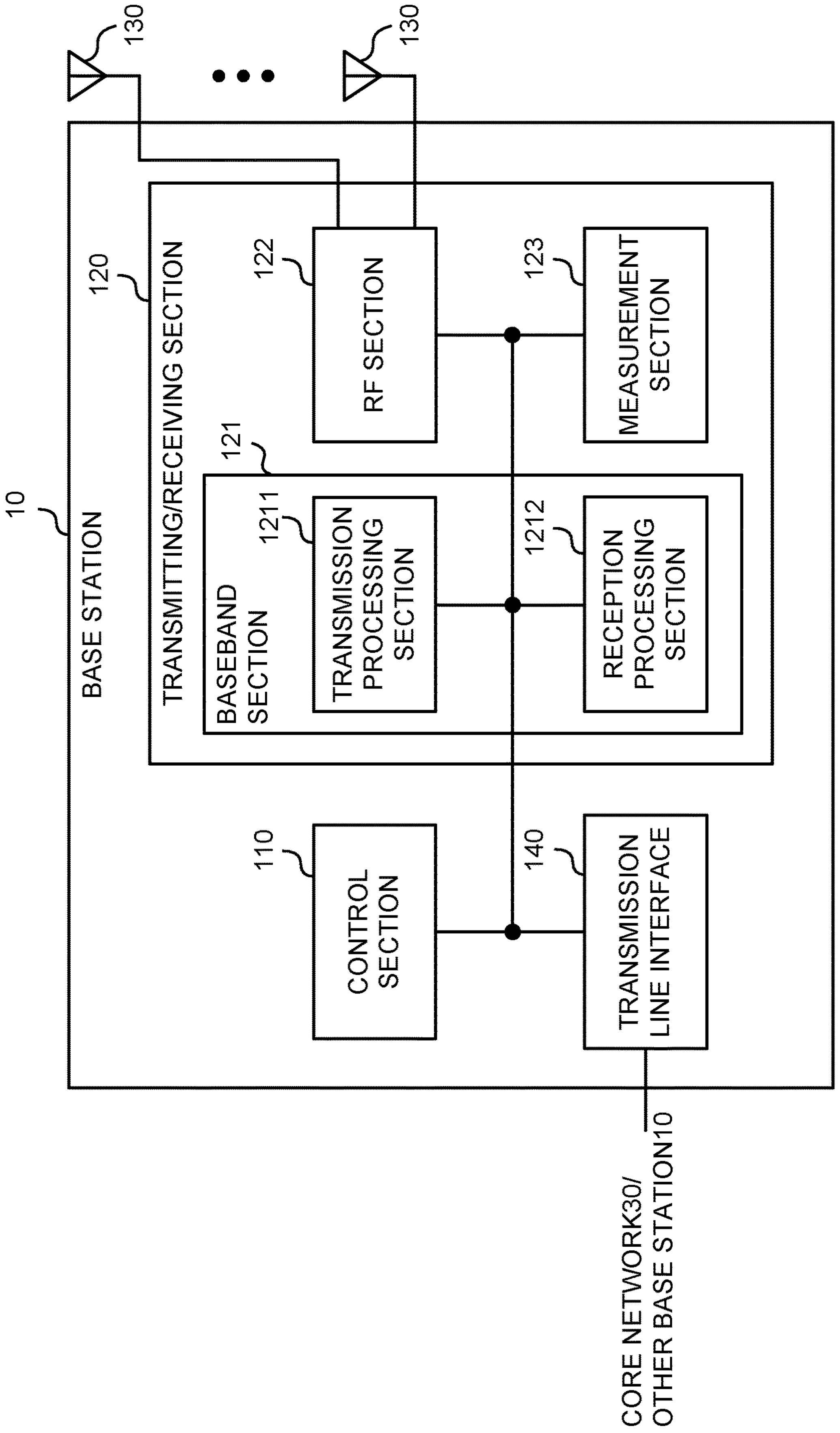
FIG. 7 is a diagram to show an example of a structure of a base station according to one embodiment.

FIG. 7 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit an indication of one or more transmission configuration indication (TCI) states for at least one of downlink and uplink, with respect to one of a plurality of cells for carrier aggregation. The control section 110 may apply the one or more TCI states to a part or all of the plurality of cells.

(User Terminal)

Figure 8:
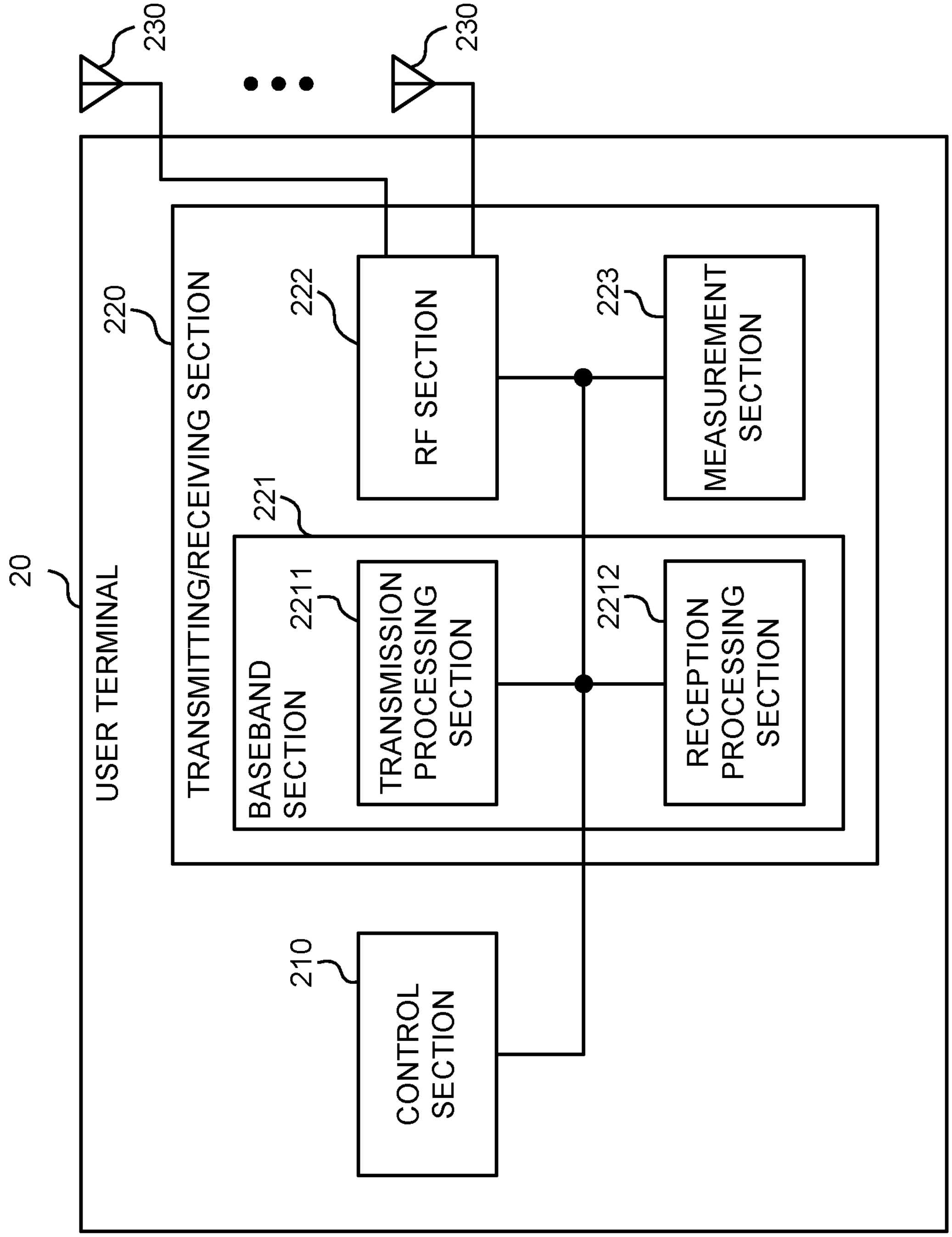
FIG. 8 is a diagram to show an example of a structure of a user terminal according to one embodiment.

FIG. 8 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211 and the RF section 222. The receiving section may be constituted with the reception processing section 2212, the RF section 222, and the measurement section 223.

The transmitting/receiving antennas 230 can be constituted with antennas, for example, array antennas or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive one or more transmission configuration indication (TCI) state lists (for example, joint TCI state pools/separate TCI state pools) for downlink and uplink for one or more cells in a plurality of cells (for example, a set of CCs/BWPs), and receive an indication (for example, MAC CE/DCI) of one or more TCI states in the one or more TCI state lists. The control section 210 may apply the one or more TCI states to a part or all of the plurality of cells.

The one or more TCI state lists may indicate respective lists of TCI states for the plurality of cells (for example, CC-specific TCI state pools) or a list of TCI states common to the plurality of cells (for example, CC-common TCI state pool).

The one or more TCI states may indicate reference signals in one cell of the plurality of cells (for example, CC-specific RSs) or a reference signal common to the plurality of cells (for example, CC-common RS).

The one or more TCI state lists may be a downlink TCI state list (for example, separate DL TCI state pool) or an uplink TCI state list (for example, separate UL TCI state pool). The one or more TCI states may be a downlink TCI state and an uplink TCI state.

The transmitting/receiving section 220 may receive an indication (for example, configuration/activation/indication/RRC IE/MAC CE/DCI) of one or more transmission configuration indication (TCI) states (for example, joint TCI/separate TCI states/DL TCI states/UL TCI states) for at least one of downlink and uplink, with respect to one of a plurality of cells (for example, a set of BWPs/CCs) for carrier aggregation (CA). The control section 210 may apply the one or more TCI states to a part (for example, a BWP/CC configured with a joint TCI state, a BWP/CC configured with a separate TCI state) or all (for example, every BWP/CC in a CC list, every BWP/CC in a band) of the plurality of cells.

The transmitting/receiving section 220 may receive a list indicating the plurality of cells (for example, CC list).

After at least a specific time (for example, Y symbols) elapses from completion of transmission of an acknowledgement (ACK) in response to the indication, the one or more TCI states may be applied to a part or all of the plurality of cells.

The specific time may be associated with a case with the one or more TCI states being at least one of a TCI state for downlink and uplink (for example, joint TCI state), a TCI state for downlink (for example, separate TCI state/DL TCI state), and a TCI state for uplink (for example, separate TCI state/UL TCI state).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 9:
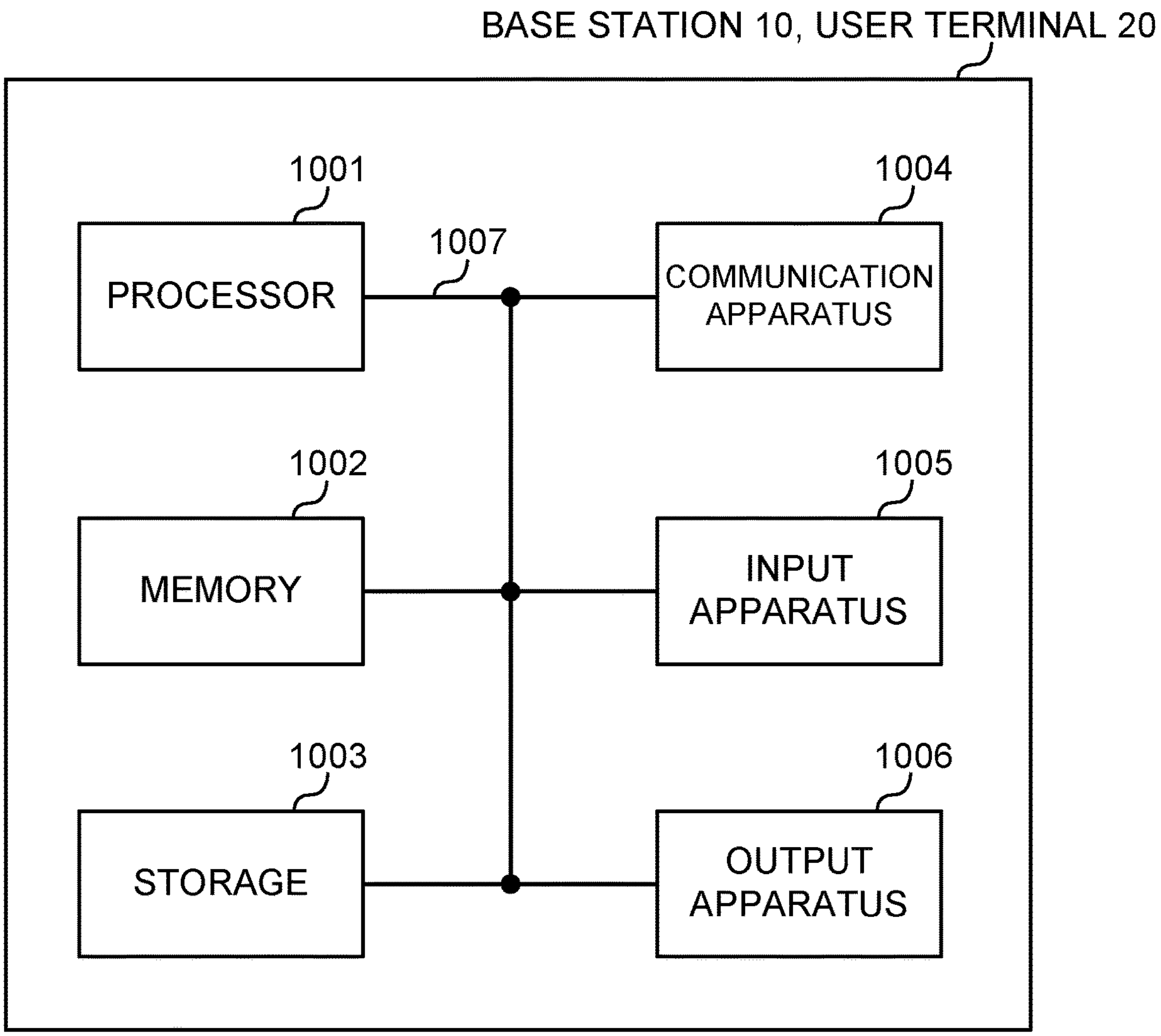
FIG. 9 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 9 is a diagram to show an example of a hardware structure of the radio base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. A "component carrier (CC)" may be referred to as a "cell," a "frequency carrier," a "carrier frequency," and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Notification of information is by no means limited to the aspects/embodiments described in the present disclosure, and other methods may be used as well. For example, notification of information in the present disclosure may be implemented by using physical layer signaling (for example, downlink control information (DCI), uplink control information (UCI)), higher layer signaling (for example, Radio Resource Control (RRC) signaling, broadcast information (master information block (MIB), system information blocks (SIBs), and so on), Medium Access Control (MAC) signaling), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, notification of certain information (for example, notification of "being X") does not necessarily have to be notified explicitly, and can be notified implicitly (by, for example, not notifying this certain information or notifying another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, terms such as "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be a device mounted on a moving object or a moving object itself, and so on.

The moving object is a movable object with any moving speed, and naturally a case where the moving object is stopped is also included. Examples of the moving object include a vehicle, a transport vehicle, an automobile, a motorcycle, a bicycle, a connected car, a loading shovel, a bulldozer, a wheel loader, a dump truck, a fork lift, a train, a bus, a trolley, a rickshaw, a ship and other watercraft, an airplane, a rocket, a satellite, a drone, a multicopter, a quadcopter, a balloon, and an object mounted on any of these, but these are not restrictive. The moving object may be a moving object that autonomously travels based on a direction for moving.

The mobile body may be a vehicle (for example, a car, an airplane, and the like), may be a mobile body which moves unmanned (for example, a drone, an autonomous vehicle, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor.

Figure 10:
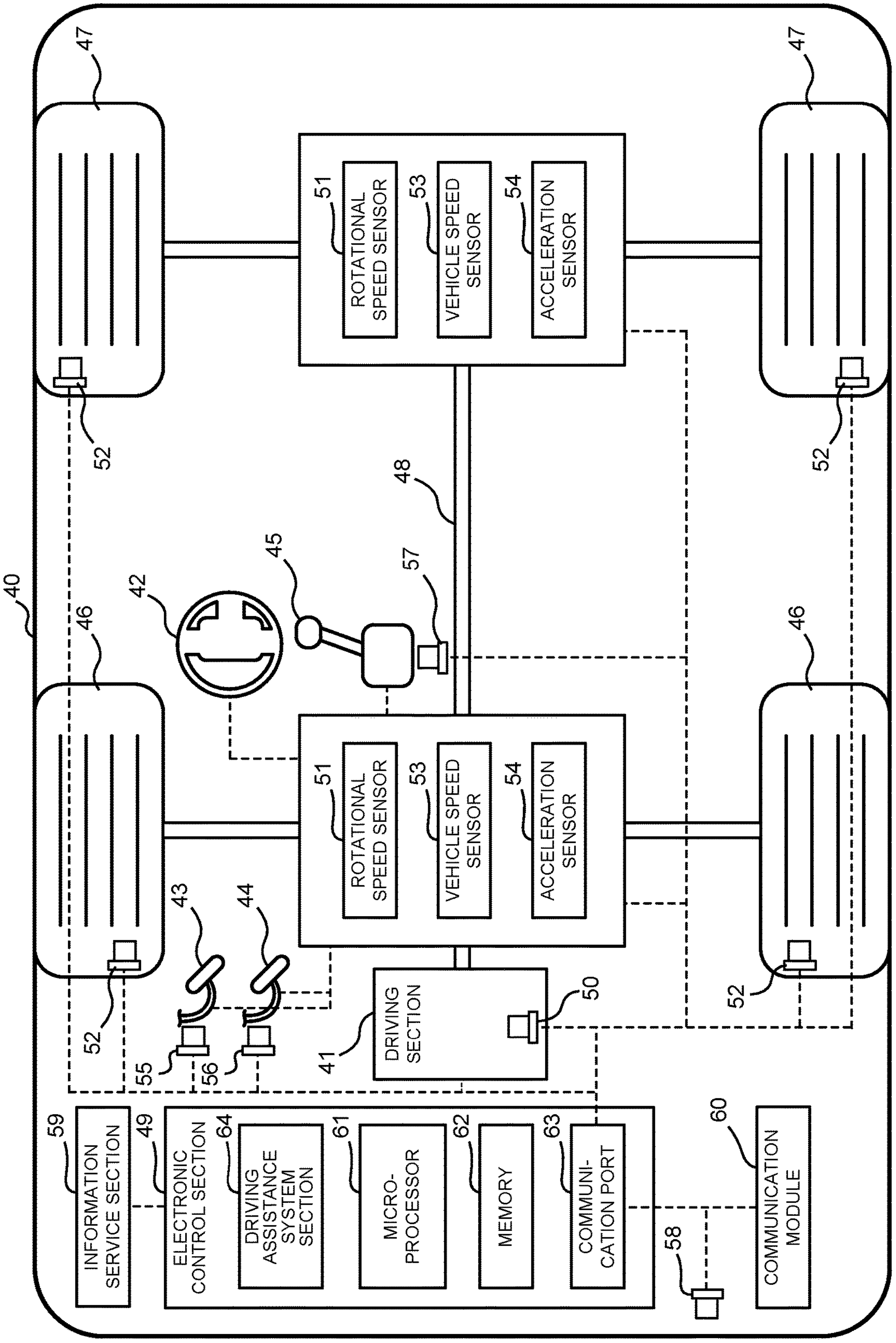
FIG. 10 is a diagram to show an example of a vehicle according to one embodiment.

FIG. 10 is a diagram to show an example of a vehicle according to one embodiment. As shown in FIG. 10, a vehicle 40 includes a driving section 41, a steering section 42, an accelerator pedal 43, a brake pedal 44, a shift lever 45, right and left front wheels 46, right and left rear wheels 47, an axle 48, an electronic control section 49, various sensors (including a current sensor 50, rotational speed sensors 51, pneumatic sensors 52, vehicle speed sensors 53, acceleration sensors 54, an accelerator pedal sensor 55, a brake pedal sensor 56, a shift lever sensor 57, and an object detection sensor 58), an information service section 59, and a communication module 60.

The driving section 41 includes, for example, at least one of an engine, a motor, and a hybrid of an engine and a motor. The steering section 42 at least includes a steering wheel, and is configured to steer at least one of the front wheels 46 and the rear wheels 47, based on operation of the steering wheel operated by a user.

The electronic control section 49 includes a microprocessor 61, a memory (ROM, RAM) 62, and a communication port (for example, an input/output (IO) port) 63. The electronic control section 49 receives, as input, signals from the various sensors 50 to 58 included in the vehicle. The electronic control section 49 may be referred to as an Electronic Control Unit (ECU).

Examples of the signals from the various sensors 50 to 58 include a current signal from the current sensor 50 for sensing current of a motor, rotational speed signals of the front wheels 46/rear wheels 47 acquired by the rotational speed sensors 51, pneumatic signals of the front wheels 46/rear wheels 47 acquired by the pneumatic sensors 52, vehicle speed signals acquired by the vehicle speed sensors 53, acceleration signals acquired by the acceleration sensors 54, a depressing amount signal of the accelerator pedal 43 acquired by the accelerator pedal sensor 55, a depressing amount signal of the brake pedal 44 acquired by the brake pedal sensor 56, an operation signal of the shift lever 45 acquired by the shift lever sensor 57, and a detection signal for detecting an obstruction, a vehicle, a pedestrian, and the like acquired by the object detection sensor 58.

The information service section 59 includes various devices for providing various pieces of information such as drive information, traffic information, and entertainment information, such as a car navigation system, an audio system, a speaker, a display, a television, and a radio, and one or more ECUs that control these devices. The information service section 59 provides various pieces of information/services (for example, multimedia information/multimedia service) for an occupant of the vehicle 40, using information acquired from an external apparatus via the communication module 60 and the like.

A driving assistance system section 64 includes various devices for providing functions for preventing an accident and reducing a driver's driving load, such as a millimeter wave radar, Light Detection and Ranging (LiDAR), a camera, a positioning locator (for example, a Global Navigation Satellite System (GNSS) and the like), map information (for example, a high definition (HD) map, an autonomous vehicle (AV) map, and the like), a gyro system (for example, an inertial measurement apparatus (inertial measurement unit (IMU)), an inertial navigation apparatus (inertial navigation system (INS)), and the like), an artificial intelligence (AI) chip, and an AI processor, and one or more ECUS that control these devices. The driving assistance system section 64 transmits and receives various pieces of information via the communication module 60, and implements a driving assistance function or an autonomous driving function.

The communication module 60 can communicate with the microprocessor 61 and the constituent elements of the vehicle 40 via the communication port 63. For example, via the communication port 63, the communication module 60 transmits and receives data (information) to and from the driving section 41, the steering section 42, the accelerator pedal 43, the brake pedal 44, the shift lever 45, the right and left front wheels 46, the right and left rear wheels 47, the axle 48, the microprocessor 61 and the memory (ROM, RAM) 62 in the electronic control section 49, and the various sensors 50 to 58, which are included in the vehicle 40.

The communication module 60 can be controlled by the microprocessor 61 of the electronic control section 49, and is a communication device that can perform communication with an external apparatus. For example, the communication module 60 performs transmission and reception of various pieces of information to and from the external apparatus via radio communication. The communication module 60 may be either inside or outside the electronic control section 49. The external apparatus may be, for example, the base station 10, the user terminal 20, or the like described above. The communication module 60 may be, for example, at least one of the base station 10 and the user terminal 20 described above (may function as at least one of the base station 10 and the user terminal 20).

The communication module 60 may transmit at least one of signals from the various sensors 50 to 58 described above input to the electronic control section 49 and information obtained based on the signals, to the external apparatus via radio communication.

The communication module 60 receives various pieces of information (traffic information, signal information, inter-vehicle distance information, and the like) transmitted from the external apparatus, and displays the various pieces of information on the information service section 59 included in the vehicle. The communication module 60 stores the various pieces of information received from the external apparatus in the memory 62 that can be used by the microprocessor 61. Based on the pieces of information stored in the memory 62, the microprocessor 61 may perform control of the driving section 41, the steering section 42, the accelerator pedal 43, the brake pedal 44, the shift lever 45, the right and left front wheels 46, the right and left rear wheels 47, the axle 48, the various sensors 50 to 58, and the like included in the vehicle 40.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The word such as "uplink" and "downlink" may be interpreted as a word corresponding to the terminal-to-terminal communication (for example, "sidelink"). For example, an uplink channel, a downlink channel, and so on may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods, next-generation systems that are enhanced, modified, created, or defined based on these, and the like. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:

a receiver that receives medium access control (MAC) control element (CE) that activates a plurality of transmission configuration indication (TCI) states for downlink (DL) and a plurality of TCI states for uplink (UL), and receives downlink control information (DCI) indicating one TCI state for DL among the plurality of TCI states for DL and one TCI state for UL among the plurality of TCI states for UL; and a processor that controls, after transmitting a positive acknowledgement to the DCI, to apply the one TCI state for DL at a first timing and to apply the one TCI state for UL at a second timing that is different from the first timing, wherein the first timing is determined based on a minimum subcarrier spacing (SCS) among SCSs of a plurality of component carriers (CCs) to which the one TCI state for DL is applied, and the second timing is determined based on a minimum SCS among SCSs of a plurality of CCs to which the one TCI state for UL is applied.

2. A radio communication method for a terminal, comprising:

receiving medium access control (MAC) control element (CE) that activates a plurality of transmission configuration indication (TCI) states for downlink (DL) and a plurality of TCI states for uplink (UL), and receiving downlink control information (DCI) indicating one TCI state for DL among the plurality of TCI states for DL and one TCI state for UL among the plurality of TCI states for UL; and controlling, after transmitting a positive acknowledgement to the DCI, to apply the one TCI state for DL at a first timing and to apply the one TCI state for UL at a second timing that is different from the first timing, wherein the first timing is determined based on a minimum subcarrier spacing (SCS) among SCSs of a plurality of component carriers (CCs) to which the one TCI state for DL is applied, and the second timing is determined based on a minimum SCS among SCSs of a plurality of CCs to which the one TCI state for UL is applied, after transmitting a positive response to the DCI.

3. A base station comprising:

a transmitter that transmits medium access control (MAC) control element (CE) that activates a plurality of transmission configuration indication (TCI) states for downlink (DL) and a plurality of TCI states for uplink (UL), and transmits downlink control information (DCI) indicating one TCI state for DL among the plurality of TCI states for DL and one TCI state for UL among the plurality of TCI states for UL; and a processor that controls, after transmitting a positive acknowledgement to the DCI, to apply the one TCI state for DL at a first timing and to apply the one TCI state for UL at a second timing that is different from the first timing, wherein the first timing is determined based on a minimum subcarrier spacing (SCS) among SCSs of a plurality of component carriers (CCs) to which the one TCI state for DL is applied, and the second timing is determined based on a minimum SCS among SCSs of a plurality of CCs to which the one TCI state for UL is applied, after transmitting a positive response to the DCI.

4. A system comprising a terminal and a base station, wherein the terminal comprises:

a receiver that receives medium access control (MAC) control element (CE) that activates a plurality of transmission configuration indication (TCI) states for downlink (DL) and a plurality of TCI states for uplink (UL), and receives downlink control information (DCI) indicating one TCI state for DL among the plurality of TCI states for DL and one TCI state for UL among the plurality of TCI states for UL; and a processor that controls, after transmitting a positive acknowledgement to the DCI, to apply the one TCI state for DL at a first timing and to apply the one TCI state for UL at a second timing that is different from the first timing, wherein the first timing is determined based on a minimum subcarrier spacing (SCS) among SCSs of a plurality of component carriers (CCs) to which the one TCI state for DL is applied, and the second timing is determined based on a minimum SCS among SCSs of a plurality of CCs to which the one TCI state for UL is applied, after transmitting a positive response to the DCI, and the base station comprises:

a transmitter that transmits the MAC CE and the DCI.

* * * * *